(12) United States Patent
Van Hook et al.

(10) Patent No.: US 6,675,239 B1
(45) Date of Patent: Jan. 6, 2004

(54) METHOD AND APPARATUS FOR PROVIDING COMMANDS TO A COMMAND MEMORY

(75) Inventors: Timothy Van Hook, Atherton, CA (US); Robert Mace, Sunnyvale, CA (US)

(73) Assignee: ATI Technologies Inc., Ontario (CA)

( * ) Notice: Subject to any disclaimer, the term of this patent is extended or adjusted under 35 U.S.C. 154(b) by 0 days.

(21) Appl. No.: 09/412,145

(22) Filed: Oct. 5, 1999

(51) Int. Cl.$^7$ ................................................. G06F 3/00
(52) U.S. Cl. ............................ 710/55; 710/52; 710/56; 711/100
(58) Field of Search ............................. 710/52, 53, 55, 710/56, 117, 119, 122; 711/100

(56) References Cited

U.S. PATENT DOCUMENTS

| | | | | |
|---|---|---|---|---|
| 6,112,267 A | * | 8/2000 | McCormack et al. | 710/52 |
| 6,184,908 B1 | * | 2/2001 | Chan et al. | 345/522 |
| 6,308,237 B1 | * | 10/2001 | Strongin et al. | 710/129 |

* cited by examiner

Primary Examiner—Kim Huynh
Assistant Examiner—Harold Kim
(74) Attorney, Agent, or Firm—J. D. Harriman, II, Esq.; Coudert Brothers LLP (57) ABSTRACT

The invention provides a method of providing commands to a command memory where a graphics processor will have commands available for execution as long as there are commands available. The command memory includes a first indicator to identify the command location most recently accessed by the graphics processor. A second indicator identifies the number of commands locations available to write commands based on the most recently accessed command location. As a result of the invention, the application processor only checks the availability of space to write commands after it has written enough commands to fill the command memory. On the graphics processor side, the command memory is never empty unless the graphics processor executes and consumes instructions faster than the instructions are written. It is also possible to associate a graphics mode with each address range. In this way, mode can be indicated without specifically sending mode information with each command.

17 Claims, 7 Drawing Sheets

FIGURE 1

PRIOR ART

STATUS BITS

METHOD AND APPARATUS FOR PROVIDING COMMANDS TO A COMMAND MEMORY

BACKGROUND OF THE INVENTION

1. Field of the Invention

This invention relates to the field of providing commands to a command memory and to the area of context switching.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. ArtX, and all ArtX-based trademarks and logos are trademarks or registered trademarks of ArtX, Inc. in the United States and other countries.

2. Background Art

Computers are often used to display graphical information. In some instances, graphical data or images are "rendered" by executing instructions from an application that is drawing the data or image to a display. An image is a regular two dimensional array in which every element of the array is a digital quantity of energy such as light/heat/density, etc. An image may also be viewed as a discretely sampled digital representation of an energy continuum with the same number of elements in each row. The image can also be procedurally generated dynamically at the time of display by the computer program or sampling device, for example. A displayed image may be made up of a plurality of graphical objects. Examples of graphical objects include points, lines, polygons, and three dimensional solid objects.

The generation of graphical display data is often accomplished by a graphics application providing commands for processing and display to a processor. In some cases, the graphics application is being executed on the same processor that is performing the drawing commands. In other cases, a separate graphics processor is used.

Consider the case where an application running on an application processor is generating commands to provide to a graphics processor for execution and ultimately, the display of graphical data. The application processor can send the commands one at a time to the graphics processor, with a new command being provided only when the application processor has been informed that the graphics processor has completed execution of the previously sent instruction. This is an inefficient system in that the graphics processor cannot operate at full speed. It is desired to have another instruction available to the graphics processor whenever it is ready for another instruction. (Note that for purposes of this invention, the terms "command" and "instruction" will be used interchangeably).

Figure 1:
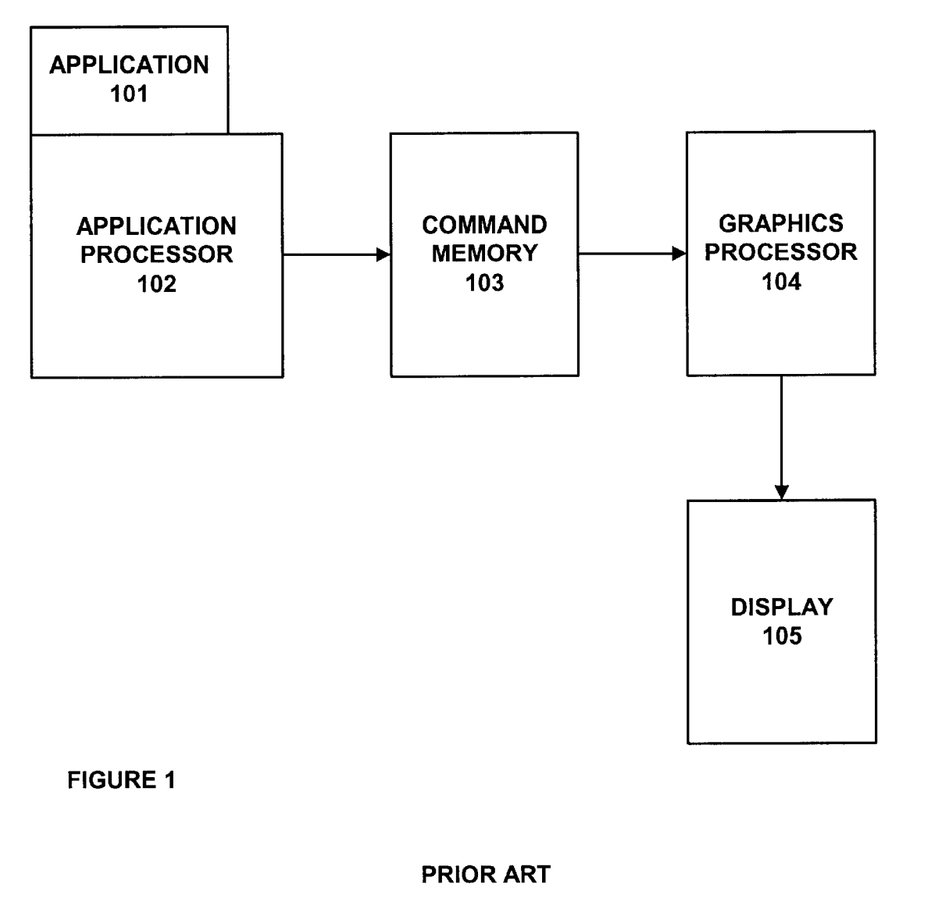
FIG. 1 is an example of a prior art command memory scheme.

One prior art solution to providing commands to a graphics processor is to provide a buffer that stores a number of drawing commands for access and execution by the graphics processor. Referring to FIG. 1, a graphics application 101 executing on an application processor 102 provides commands to command memory 103. Command memory 103 is accessed by graphics processor 104 which executes commands and provides display data to display 105.

Command memory 103 consists of, for example, 256 lines where instructions can be stored. In this prior art scheme, application processor 102 writes 256 commands to command memory 103. The graphics processor 104 is then notified that the command memory is full and begins executing commands. Periodically, the application processor polls the command memory to see if it is empty (that is, if all commands have been read by graphics processor 104). When command memory 103 is empty, application processor 102 writes another 256 commands.

A disadvantage of the scheme of FIG. 1 is that the polling of command memory 103 by application processor 102 is time consuming and wastes processor cycles. Another disadvantage is that the time needed by the graphics processor 104 to read and execute all the commands in command memory 103 is not constant. Therefore, the graphics processor may be waiting for instructions for some time before the application processor is informed to write more commands. As noted above, it is inefficient for the command processor to be waiting for commands.

Another prior art scheme in a PC environment consists of repeatedly writing commands to a single write address which then go into a FIFO that feed into a command interpreter. In such a scheme, the writing application is performed as an "uncached" operation. This scheme is inefficient in that it takes too many processor cycles to accomplish writes of commands.

Another disadvantage of prior art schemes occurs when more than one application is issuing drawing commands. One prior art solution is to only permit one application to issue drawing commands at a time. But this solution is not efficient and fails to take advantage of multitasking capable computer systems. Another prior art scheme is to implement a graphics driver instead of writing to a graphics processor. The driver then acts as a traffic controller and gatekeeper to the graphics processor. The driver can identify the application writing commands and can inhibit the processing of commands from another application until the first application's state has been saved and the new application's state has been applied. A disadvantage of the driver scheme is that it adds another layer of overhead and requires the commands to be first written to the driver and then again to the graphics processor. Also, the driver, because it must communicate with multiple applications, must be separate from any one application. It must be part of the operating system, so that the processor state is changed from application address space to operating system address space every time there is a change in applications writing to the driver.

SUMMARY OF THE INVENTION

The invention provides a method of providing commands to a command memory where a graphics processor will have commands available for execution as long as there are commands available. The command memory includes a first indicator to identify the command location most recently accessed by the graphics processor. A second indicator identifies the number of commands locations available to write commands based on the most recently accessed command location. Consider where a processor initially fills a command memory of, for example, 256 command locations. The application processor writes 256 commands to the command memory. After completing the writing of 256 commands, the application processor checks the location of the most recently accessed command location by the graphics processor. This is made available through a register on the graphics processor that stores the address of the most recently accessed command location. If the most recently accessed command location is, for example, the 10th command location, the application processor can write 10 commands to the command memory. It then checks again for the most recently accessed command location (as it does each time after writing the permissible amount of commands). Consider now that the most recently accessed command location is location 45. The application processor can now write 35 commands (from the 10th location to the 45th location) before again determining the most recently accessed command memory location. As a result of the invention, the application processor only checks the availability of space to write commands after it has written enough commands to fill the command memory. On the graphics processor side, the command memory is never empty unless the graphics processor executes and consumes instructions faster than the instructions are written (an unlikely event).

In another embodiment of the invention, it is possible to identify which of a number of applications are writing commands to the command memory by having each application write to an associated address range. When commands are written to one of the address ranges, that range becomes a current context. A shadow memory is used for writes to address ranges other than the current context. When the context changes, commands from the shadow memory is swapped into the command processor as appropriate, with commands from the address range that was previously a current context being swapped to shadow memory. It is also possible to associate a graphics mode with each address range. In this way, mode can be indicated without specifically sending mode information with each command.

DETAILED DESCRIPTION OF THE INVENTION

In the following description, numerous specific details are set forth in order to provide a more thorough understanding of the present invention. It will be apparent, however, to one skilled in the art, that the present invention may be practiced without these specific details. In other instances, well-known features have not been described in detail in order not to unnecessarily obscure the present invention.

Figure 2:
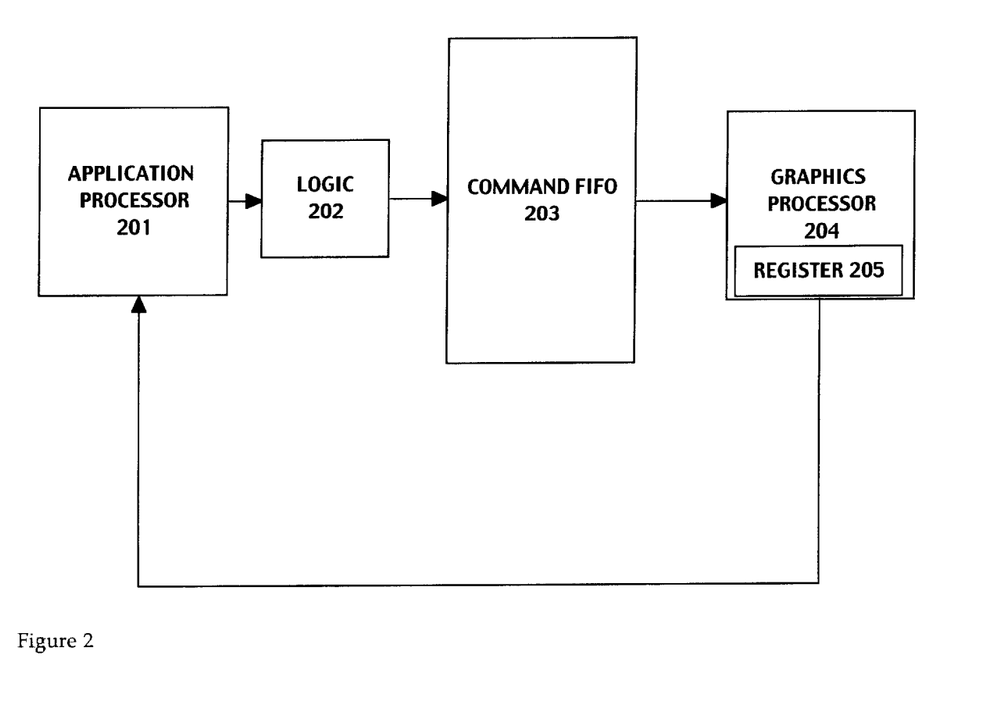
FIG. 2 is a diagram of one embodiment of the present invention.

One embodiment of the present invention is illustrated in FIG. 2. An application processor 201 is coupled to logic 202 and to command FIFO 203. Command FIFO 203 is coupled to graphics processor 204. Graphics processor 204 includes register 205 that is coupled to and can be read by application processor 201. The register stores the command location of the most recently read command line of FIFO 203.

Logic 202 is used to determine how many instructions can be written by the application processor 201 and to which command locations in FIFO 203. This is calculated from a current start location value and current end location value stored in logic 202. Initially, the current start location is command location 0 of FIFO 203, and current end location is command location 255 (for a 256 line command memory). The application processor can thus write 256 commands starting at command location 0 and continuing to command location 255. After a write operation has been completed, the current start location is reset to be current end location plus one. Note that the FIFO is a wraparound FIFO so that after writing location 255, the next location written is location 0. Thus, after the first write, the current start location is the current end location (255) plus one, or location 0. The current end location is determined by reading the register 205 of graphics processor 204. By the time application processor has completed writing 256 commands, graphics processor has consumed some number of commands and so is at a current command location X.

In this case, consider where X=command location 44. The new current end location thus becomes 44 and the command processor can write a number of commands starting at command location 0 and equal to (current end location 44–current start location 0) 44 commands. After the write operation the current start location becomes the current end location plus one, or command location 45. The value of register 205 becomes the new current end location. Consider where the graphics processor 204 has consumed 250 commands during the writing of the 44 new commands. The value of the register will be command location 38 (because of the wraparound condition). The application processor can then write 250 commands starting at location 45 and continuing to location 38. The process continues until the application processor has no more commands to write.

An advantage of the scheme of the invention is that the graphics processor never has to wait for instructions. At most, it executes instructions as fast as the application processor can write them. Typically it will be executing a number of instructions already written by the application processor. Another advantage of the present invention is that the application processor does not need to poll the command memory or wait until all instructions have been consumed. Instead, the application processor reads a register only when it is ready to write more commands to the command FIFO.

Figure 3:
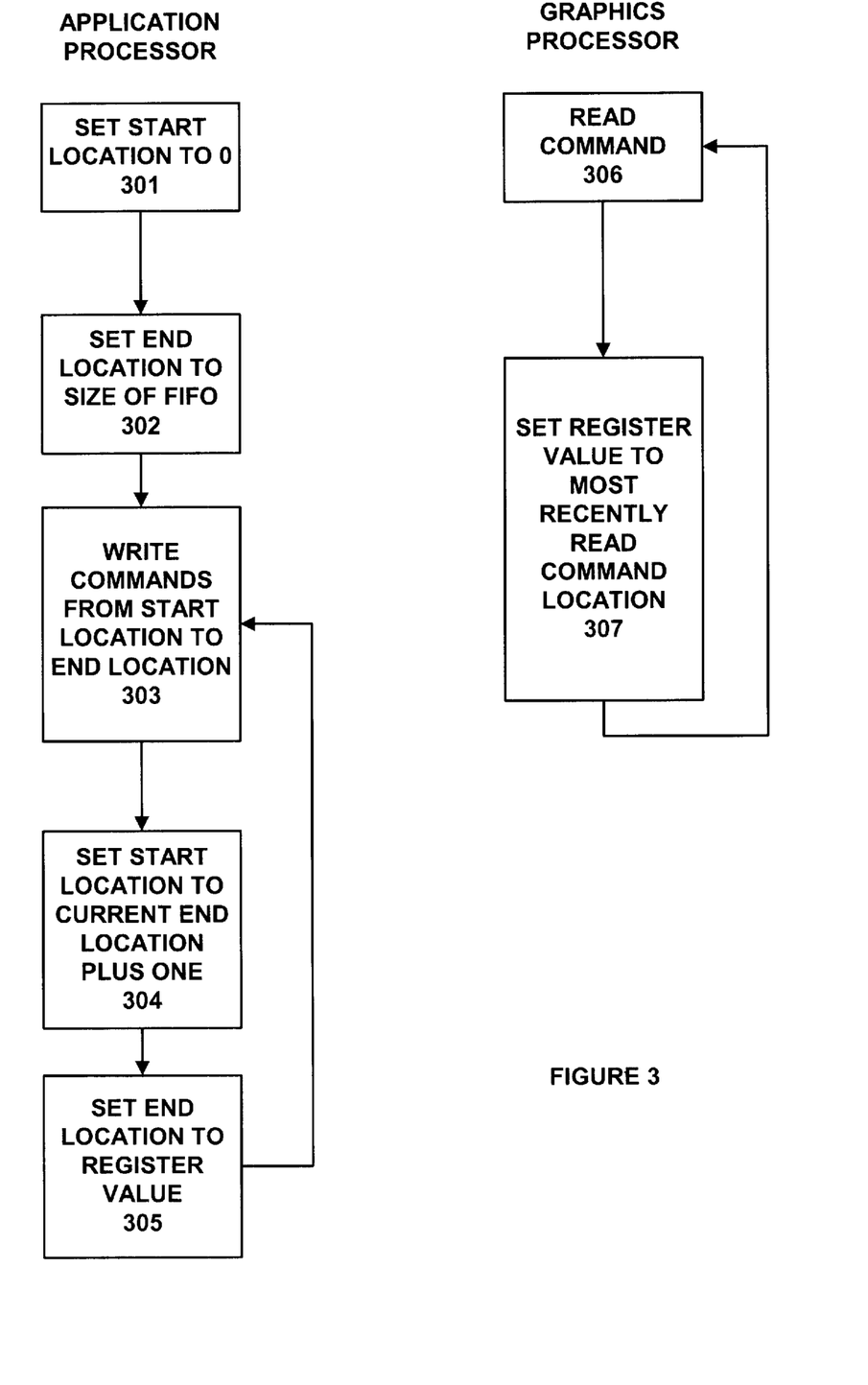
FIG. 3 is a flow diagram of the present invention.

A flow diagram of the operation of the present invention is illustrated in FIG. 3. Steps 301 through 305 represent activity at the application processor and steps 306 and 307 represent activity at the graphics processor. At step 301 the application processor sets the start location equal to zero. At step 302 the end location is set to the size of the FIFO. At step 303, the application processor writes commands from the start location to the end location. At step 304 the end location is set to the current start location plus one (wrapping when appropriate). At step 305 the end location is set to the value of the most recently read command location register of the graphics processor and the system returns to step 303.

At step 306 the graphics processor reads a command from a command location of the command FIFO. At step 307 the register of the graphics processor is set to a value equal to the command location of the most recently read command location and the system returns to step 306.

Context Switching

One embodiment of the present invention also provides a solution when multiple applications are issuing drawing commands to the graphics processor. In the prior art, it was not possible to identify multiple applications writing to a graphics processor without the use of a graphics, driver, which added an unwanted overhead layer to the system. (In Unix workstations, graphic context switching can be controlled by the application process switching in the OS. But this is only possible where vendors have control of the OS, such as in a Unix environment.) The present invention provides a scheme for context switching and state change even when the applications are not aware that they are writing to a graphics processor at all.

The present invention assigns different address ranges to each application writing to the graphics processor. When a first application begins issuing drawing commands, the application is assigned an address range other than the physical address range of the command FIFO. The address range is then mapped into associated locations in the command FIFO. When subsequent applications issue drawing commands, they are each assigned different address ranges which are also mapped to the command FIFO.

Control logic detects the address that is being written to by an application and compares it to assigned address ranges to determine which application is issuing commands and if the application is other than the current application issuing commands. The application presently writing commands is referred to as the "current context". Each range of addresses has an associated context number so that, for example, the first range is context 1, the second range is context 2 and so on. When the address range being written to indicates a different context than the current context, the present invention becomes aware that the graphics processor state needs to be changed.

The states of the various contexts are maintained in RAM as "shadow" copies of the graphics processor state. When context changes, the current context is written from the command FIFO to the associated shadow memory for that context. Then the contents of the shadow memory of the new current context are written from shadow memory into the command FIFO.

Figure 4:
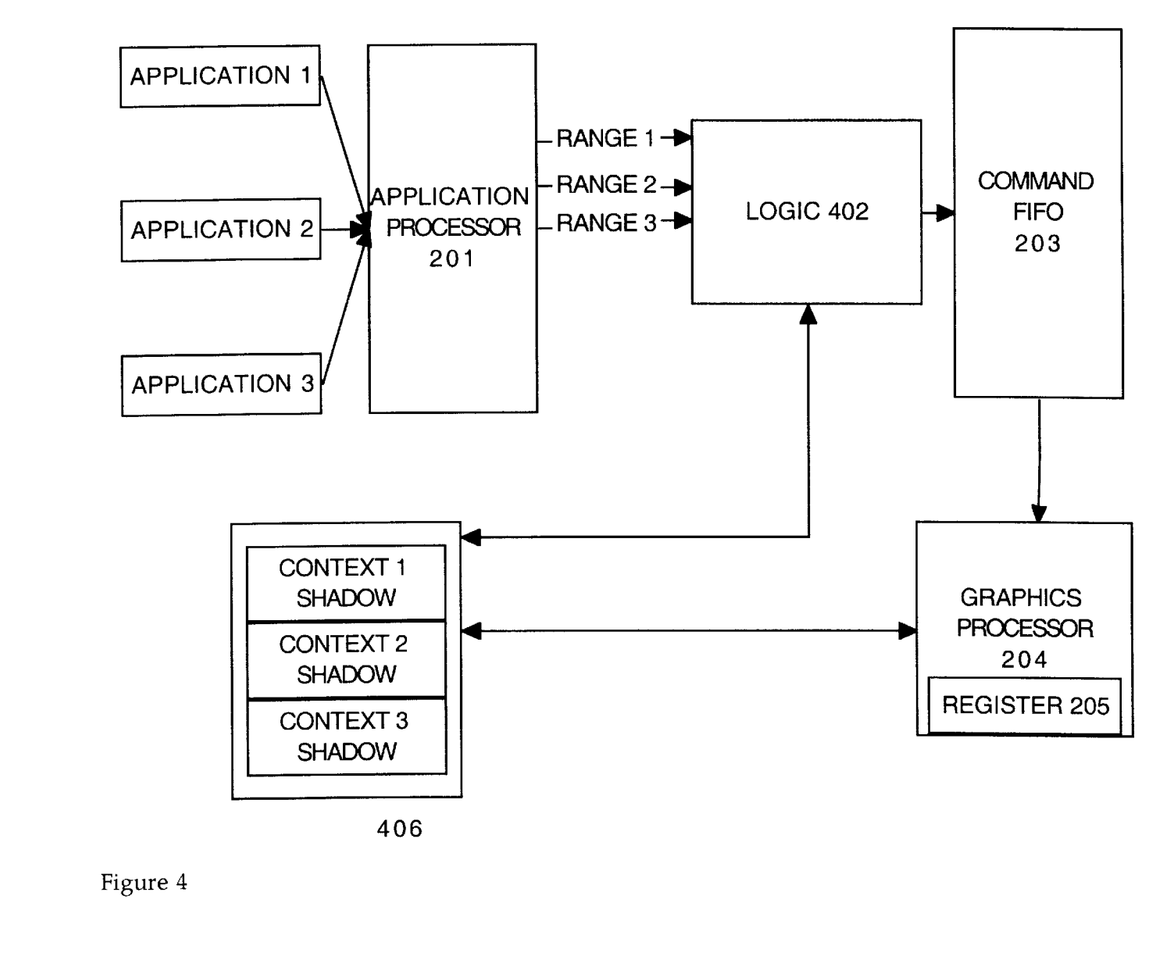
FIG. 4 is a diagram of another embodiment of the present invention.

FIG. 4 illustrates an example of this embodiment of the invention. Three applications are writing drawing commands to application processor 201. The applications are numbered 1, 2, and 3 in the order in which they began writing commands. The processor 201 assigns each application a unique address range as they begin writing commands. Here applications 1, 2, and 3 are assigned address ranges 1, 2, and 3 respectively. As the commands are provided to logic 402, a comparison is made of the address of the current command to the assigned ranges to determine which context is currently being written. The present invention identifies contexts rather than specific applications because the address range used by an application can vary depending on its activity. An application that is writing to address range 1 and is then is shut down may later write to address range 2 when it is invoked again.

Logic 402 next determines if the context being written is the same as the current context of the graphics processor. For example, if the graphics processor is currently processing commands for context 2 and commands are written in range 2, the context being written is context 2, matching the current context. In this case, the commands are simply passed through to the graphics processor 204. If the commands being written are from a different context, say context 3, while the current context is context 2, a context switch must occur.

In a context switch the commands and graphics processor state of the current context are written to the appropriate context shadow memory in RAM 406. Thus, the command and graphics processor state are written to context 2 shadow in RAM 406. Then the new context shadow contents are written to the command FIFO. Here the context 3 shadow memory are written to command FIFO and graphics processor 204. The state will include the current start location, current end location, and most recently read location (in register 205).

Non-Sequential Command Processing

Figure 5:
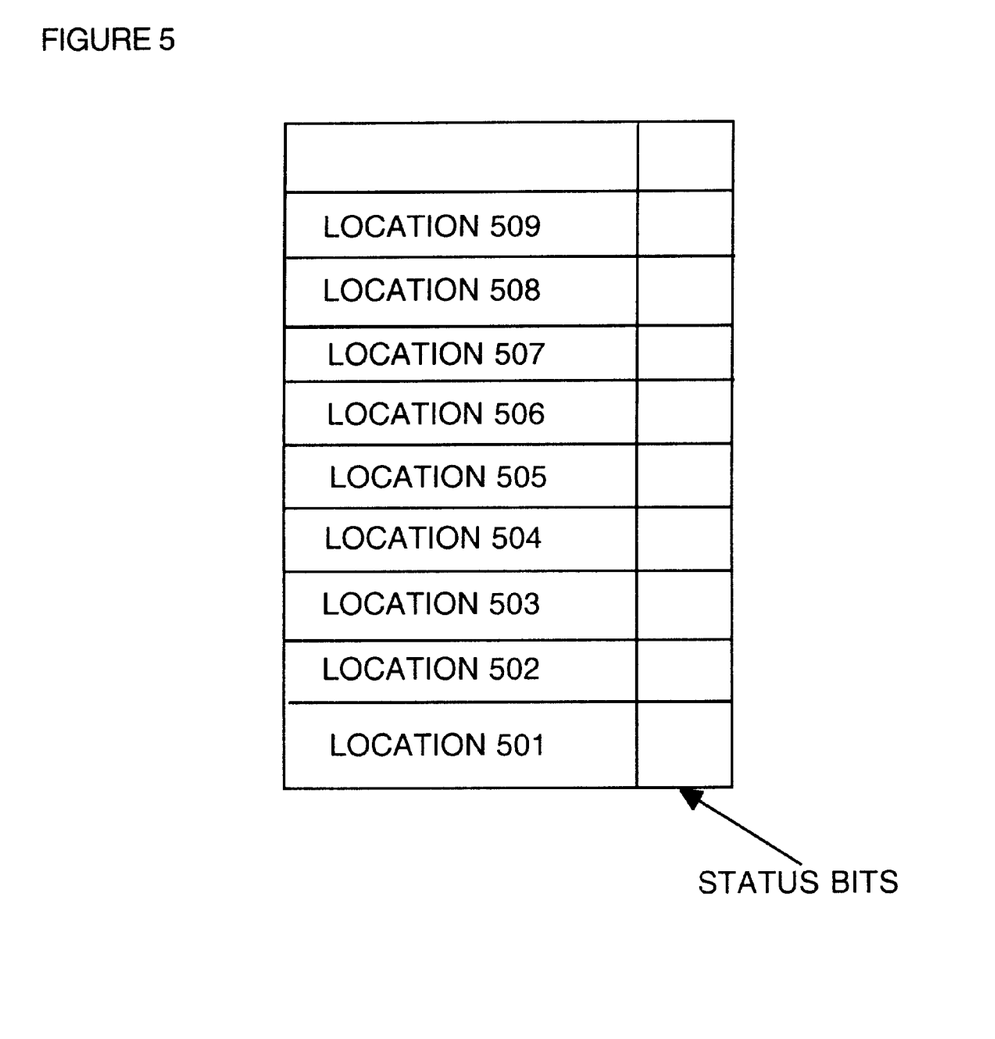
FIG. 5 illustrates a portion of command FIFO 203.

Another embodiment of the invention provides for non-sequential writing and reading of commands from the command FIFO. Referring to FIG. 5, a portion of the command FIFO 203 shows command locations 501–507. Each command location includes a status value bit. The bit is set to valid or invalid (1 or 0, or 0 or 1) to indicate whether the command location can be read from or written to. In one embodiment, the status is set to valid when written by the application processor and to invalid when read by the graphics processor. The graphics processor only reads valid commands and can do so sequentially or non-sequentially. In addition, the application processor can write commands non-sequentially if necessary, because the graphics processor only reads valid commands.

In another embodiment, the present invention contemplates a valid status bit for words within a command line location. In this manner, the valid/invalid status of individual words of a command line can be communicated to the application processor and graphics processor.

Mode Memory

In addition to switching contexts, it is sometimes necessary to switch a graphics mode during processing. During a context switch, the current mode must be written to RAM and the new mode must be written to the command FIFO.

Embodiment of General-Purpose Computer Environment

Figure 6A:
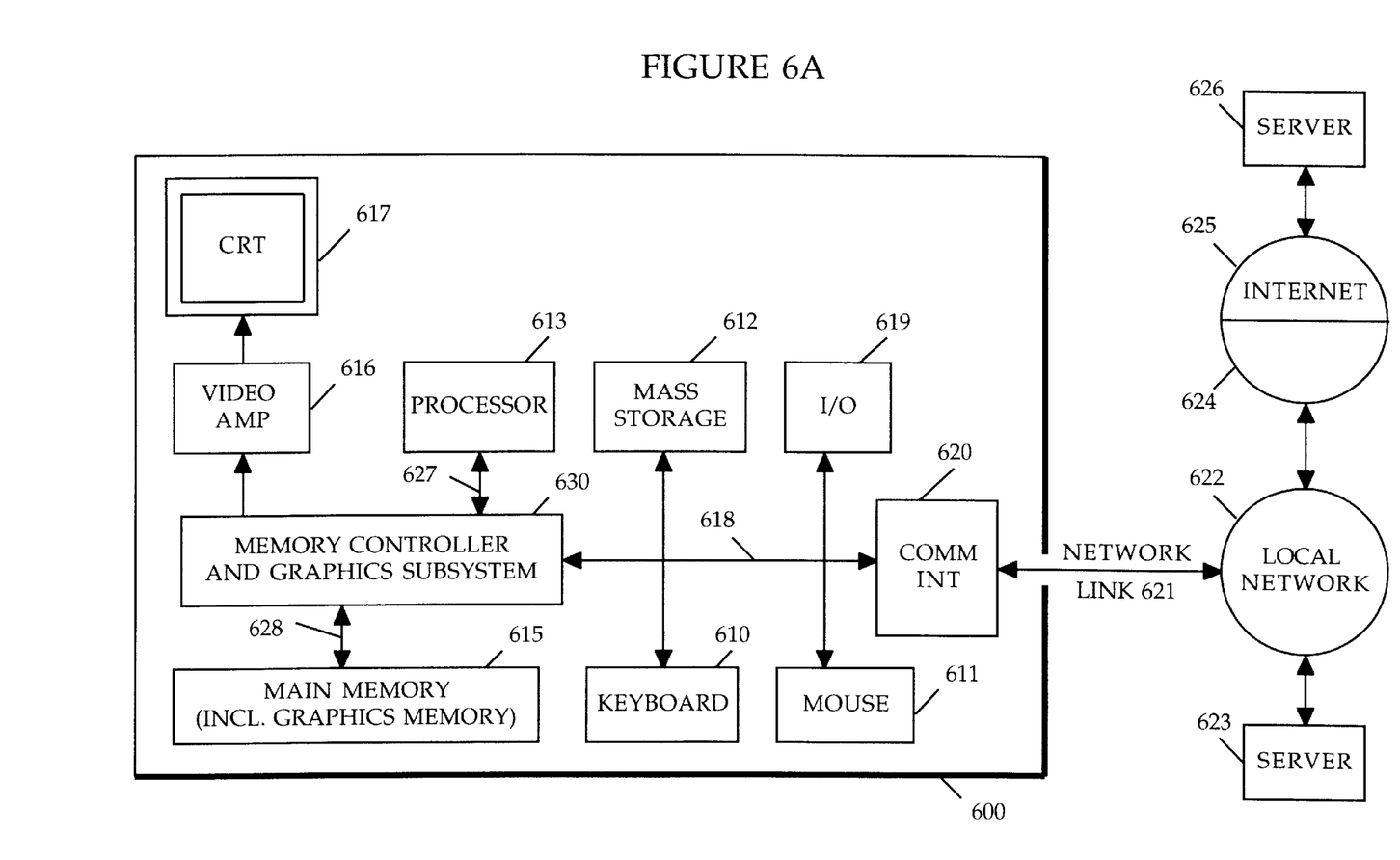
FIGS. 6A and 6B are examples of a general purpose computer system in which an embodiment of the invention may be implemented.
Figure 6B:
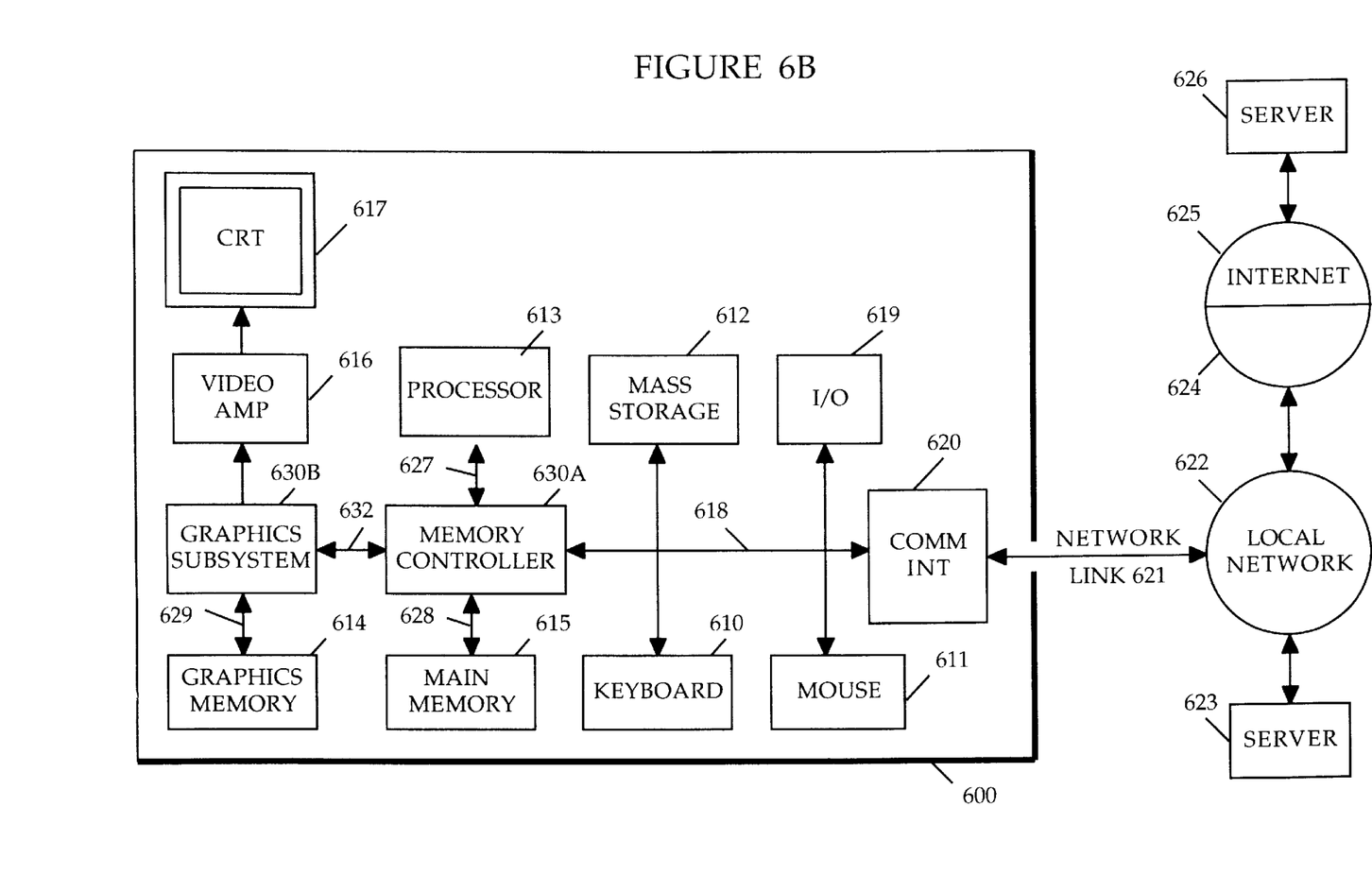

An embodiment of the invention can be implemented as computer hardware or a combination of computer software (or firmware) and hardware in a general purpose computer such as the embodiments of computer 600 illustrated in FIGS. 6A and 6B. The embodiment of FIG. 6A includes a combined memory controller and graphics subsystem accessing a main memory, whereas the embodiment of FIG. 6B includes a graphics subsystem with graphics memory separate from the memory controller and main memory.

In FIG. 6A, keyboard 610, mouse 611, I/O unit 619 and mass storage 612 are coupled to a bidirectional I/O bus 618. The keyboard and mouse are for introducing user input to the computer system and communicating that user input to processor 613. Other suitable input devices may be used in addition to, or in place of, the mouse 611 and keyboard 610. I/O (input/output) unit 619 represents such I/O elements as a printer, A/V (audio/video) I/O, etc. Mass storage 612 may include both fixed and removable media, such as magnetic, optical or magnetic optical storage systems or any other available mass storage technology.

Memory controller and graphics subsystem 630 is coupled to I/O bus 618, video amplifier 616, processor 613 (via processor bus 627) and main memory 615 (via main memory-bus 628). Memory controller and graphics subsystem 630 provides an interface between processor 613, main memory 615, video amplifier 616 and the components of I/O bus 618. An embodiment of the invention may be implemented as part of memory controller and graphics subsystem 630. The memory controller and graphics subsystem may provide 2-D (two-dimensional) and/or 3-D (three-dimensional) graphics processing capability for the computer system in the form of hardware and software. Memory controller and graphics subsystem 630 can load graphical data and graphical object models, from main memory 615 or mass storage 612 to perform pixel rendering operations for display. The graphical output of memory controller and graphics subsystem 630 is typically forwarded to a frame buffer for display via video amp 616 and CRT 617.

Busses 618, 627 and 628 may contain, for example, thirty-two address lines for addressing coupled components, and a 32 bit data bus for transferring data between and among the components. Alternatively, multiplexed data/ address lines may be used instead of separate data and address lines. Bus widths other than 32-bits may also be used.

In one embodiment of the invention, processor 613 is a microprocessor manufactured by Motorola, such as the 680X0 processor or a microprocessor manufactured by Intel, such as the 80X86, or Pentium processor, or a SPARC microprocessor from Sun Microsystems, Inc. However, any other suitable microprocessor or microcomputer may be utilized. Main memory 615 comprises dynamic random access memory (DRAM), and may further comprise graphics memory for use in graphical processing, though standard DRAM may be used to perform graphical processing as well. Video amplifier 616 is used to drive the cathode ray tube (CRT) raster monitor 617. Video amplifier 616 is well known in the art and may be implemented by any suitable apparatus. This circuitry converts pixel data stored in a frame buffer in memory controller and graphics subsystem 630 to a raster signal suitable for use by monitor 617. Monitor 617 is a type of monitor suitable for displaying graphic images. Alternatively, memory controller and graphics subsystem 630 may be used to drive a flat panel or liquid crystal display (LCD), or any other suitable data presentation device.

Computer 600 may also include a communication interface 620 coupled to bus 618. Communication interface 620 provides a two-way data communication coupling via a network link 621 to a local network 622. For example, if communication interface 620 is an integrated services digital network (ISDN) card or a modem, communication interface 620 provides a data communication connection to the corresponding type of telephone line, which comprises part of network link 621. If communication interface 620 is a local area network (LAN) card, communication interface 620 provides a data communication connection via network link 621 to a compatible LAN. Communication interface 620 could also be a cable modem or wireless interface. In any such implementation, communication interface 620 sends and receives electrical, electromagnetic or optical signals which carry digital data streams representing various types of information.

Network link 621 typically provides data communication through one or more networks to other data devices. For example, network link 621 may provide a connection through local network 622 to local server computer 623 or to data equipment operated by an Internet Service Provider (ISP) 624. ISP 624 in turn provides data communication services through the world wide packet data communication network now commonly referred to as the "Internet" 625. Local network 622 and Internet 625 both use electrical, electromagnetic or optical signals which carry digital data streams. The signals through the various networks and the signals on network link 621 and through communication interface 620, which carry the digital data to and from computer 600, are exemplary forms of carrier waves transporting the information.

Computer 600 can send messages and receive data, including program code, through the network(s), network link 621, and communication interface 620. In the Internet example, remote server computer 626 might transmit a request for an application program or data through Internet 625, ISP 624, local network 622 and communication interface 620.

The received data may be stored in mass storage 612, or other nonvolatile storage for later use. In this manner, computer 600 may obtain data in the form of a carrier wave.

FIG. 6B illustrates a further embodiment of a general purpose computer wherein the graphics subsystem is implemented as a functional block separate from the memory controller, and wherein the graphics subsystem is configured with separate graphics memory 614 accessible over a graphics memory bus 629. As with memory controller and graphics subsystem 630 of FIG. 6A, memory controller 630A of FIG. 6B is coupled to processor 613, main memory 615 and I/O bus 618. However, in FIG. 6B, memory controller 630A interfaces with graphics subsystem 630B via a graphics bus 632 for handling of graphical output and certain graphical processing functions (e.g., pixel rendering). Graphical subsystem 630B is equipped with graphics memory 614 for storing graphical processing data. As with FIG. 6A, graphical output of graphics subsystem 630B may be stored in a frame buffer (not shown) and output for display via video amplifier 616 and monitor 617.

The computer systems described above are for purposes of example only. An embodiment of the invention may be implemented in any type of computer system or graphics processing environment.

Thus, a method and apparatus for providing commands to a command memory is described in conjunction with one or more specific embodiments. The invention is defined by the claims and their full scope of equivalents.

what is claimed is:

1. A command memory system for receiving commands from a first device and providing said commands for execution by a second device, said command memory comprising:

a plurality of command locations wherein each of said command locations has an associated status value;

a first indicator identifying a most recently command location accessed by said second device; and a second indicator for indicating to said first device an available number of command locations available to receive commands from said first device based on said most recent command location.

2. The command memory of claim 1 wherein said second indicator means calculates said available number of command locations based on the difference between said most recent command location and a most recently written command location.

3. The command memory of claim 2 wherein said second indicator performs its calculation when said first device has written a number of commands equal to a previously calculated available number of command locations.

4. The command memory of claim 1 wherein said command memory comprises a FIFO.

5. The command memory of claim 1 wherein said first device comprises a processor.

6. The command memory of claim 5 wherein said second device comprises a graphics processor.

7. The command memory of claim 6 wherein said graphics processor reads sequentially valid command locations.

8. The command memory of claim 1 wherein a plurality of words are stored in each of said command locations and each of said words has an associated status value.

9. A method of providing commands to a command memory having a plurality of command locations comprising the steps of:

(a) providing a number of commands equal to said plurality of command locations wherein each of said command locations has an associated status value;

(b) identifying a most recent command location from which a command has been read;

(c) determining an available number of command locations available to receive commands based on said most recent command location;

(d) providing a number of commands to said command memory equal to said available number of command locations; and (e) repeating steps (b) through (d).

10. The method of claim 9 wherein said step of determining said available number of command locations comprises determining a number of commands executed since a most recent providing of commands.

11. The method of claim 10 wherein said commands are provided by a processor.

12. The method of claim 11 wherein said commands are read by a graphics processor.

13. The method of claim 12 wherein a status value is set to an invalid value for a command read by said graphics processor.

14. The method of claim 13 wherein a status value is set to a valid value when a command is provided by said processor.

15. The method of claim 14 wherein said graphics processor reads sequentially valid command locations.

16. The method of claim 9 wherein said commands are provided to said available command locations in non-sequential order.

17. The method of claim 9 wherein a plurality of words are stored in each of said command locations and each of said words has an associated status value.

* * * * *